United States Patent [19]

Willms et al.

[11] Patent Number: 6,095,475
[45] Date of Patent: Aug. 1, 2000

[54] MANUAL HEIGHT ADJUSTMENT ASSEMBLY FOR A VEHICLE SEAT

[75] Inventors: David C. Willms, Georgetown; Pascal Garrido, Gravehurst, both of Canada

[73] Assignee: Dura Automtive Properties Inc., Rochester Hills, N.Y.

[21] Appl. No.: 09/178,123

[22] Filed: Oct. 23, 1998

[51] Int. Cl.[7] ............................. F16M 13/00; A47C 1/06
[52] U.S. Cl. ...................... 248/421; 248/597; 297/344.15
[58] Field of Search .................... 248/421, 564, 248/588, 584, 565, 576, 577, 578, 579, 580, 582, 583, 587, 590, 591, 592, 595, 597, 607, 608, 188.2, 585, 593, 594, 125.1, 125.8; 297/312, 311, 338, 339, 344.12, 344.15

[56] References Cited

U.S. PATENT DOCUMENTS

| | | | |
|---|---|---|---|
| 2,195,507 | 4/1940 | Best ........................................ | 248/421 |
| 2,235,237 | 3/1941 | Saunders et al. ....................... | 248/421 |
| 2,239,917 | 4/1941 | Hunter et al. ........................... | 248/421 |
| 2,609,029 | 9/1952 | Haberstump ........................... | 248/421 |
| 2,757,712 | 8/1956 | Johnson .................................. | 248/597 |
| 3,149,815 | 9/1964 | Cotter .................................... | 248/421 |
| 3,460,793 | 8/1969 | Posh ...................................... | 248/421 |
| 4,128,225 | 12/1978 | Kluting et al. ......................... | 248/421 |
| 4,482,120 | 11/1984 | Fudala ................................... | 248/421 |
| 4,643,383 | 2/1987 | Fukuta ................................... | 248/421 |
| 4,648,575 | 3/1987 | Kawade ................................. | 248/421 |
| 4,767,157 | 8/1988 | Kazoaka et al. ....................... | 248/421 |
| 4,778,139 | 10/1988 | Babbs .................................... | 248/421 |
| 4,834,333 | 5/1989 | Saito et al. ............................. | 248/421 |
| 4,903,931 | 2/1990 | Shimazaki ............................. | 248/421 |
| 5,203,532 | 4/1993 | Matsuura ............................... | 248/394 |
| 5,775,661 | 7/1998 | Matsumoto et al. ................... | 248/421 |
| 5,863,098 | 1/1999 | Kojima ................................. | 297/344.15 |

FOREIGN PATENT DOCUMENTS 55-55023  4/1980  Japan ..................................... 248/421

*Primary Examiner*—Anita M. King
*Assistant Examiner*—Michael Nornberg
*Attorney, Agent, or Firm*—Robert K. Roth

[57] ABSTRACT

A manual adjustment assembly for adjusting the height of a vehicle seat includes mounting brackets for supporting a seat bottom that is movable between a lowered position and a raised position. Separate adjustment assemblies can be installed at the front and rear portions of the seat for adjusting the height of the front portion independently from the rear portion. Or, a single adjustment assembly can be used to adjust the height of either the front or rear portion where the adjustment assembly includes a connecting linkage assembly to correspondingly adjust the height of the other portion of the seat bottom. The adjustment assembly includes a torque tube extends between the mounting brackets and is actuated by an actuator that selectively supplies rotational input to the torque tube. A drive link is supported on one end of the torque tube and is fixed for rotation with the torque tube as the tube receives input from the actuator. The adjustment assembly also includes a spring that operates with the torque tube and the drive link to assist movement of the seat member from the lowered position to the raised position when actuated by the actuator.

13 Claims, 5 Drawing Sheets

MANUAL HEIGHT ADJUSTMENT ASSEMBLY FOR A VEHICLE SEAT

BACKGROUND OF THE INVENTION

This application relates generally to a manual adjustment assembly for adjusting the height of a seat within a vehicle. More particularly, this invention relates to a mounting for a vehicle seat with an adjustment assembly having a torque tube and assist spring for moving a vehicle seat bottom from a lowered position to a raised position.

Seat adjustment assemblies used to adjust the position of seats within vehicles in various directions are generally well known. Most arrangements provide for a seat to be moved or adjusted in forward and rearward directions within a vehicle.

In many circumstances, it is desirable to have a seat adjustment assembly that can vertically move a seat between lowered and raised positions. Such an arrangement is necessary, for example, to accommodate vehicle drivers that are of varying heights.

Manual adjustment assemblies that are provided for adjusting vehicle seat positions are often complex. This is especially true when the adjustment assemblies include the capability for moving the seat bottom vertically with respect to the vehicle. When an occupant is seated on the seat bottom and wants to raise the seat, the adjustment assembly must be capable of assisting the occupant to lift the weight of the seat and the weight of the occupant. Thus, the adjustment assembly must be easily operated and durable. These complex mounting assemblies require a great number of components, which increases the assembly time and the overall cost of the seat assembly.

Accordingly, it is desirable to provide a simplified and inexpensive manual adjustment assembly for a vehicle seat that includes adjustment capability for easily moving a seat in a vertical direction when occupied. It is also desirable for the adjustment assembly to be durable, easy to operate, and quiet.

SUMMARY OF THE INVENTION

In general terms, this invention is a manual adjustment assembly for adjusting the height of a vehicle seat by moving the seat between a lowered position and a raised position. Separate adjustment assemblies can be installed at the front and rear portions of the seat for adjusting the height of the front portion independently from the rear portion. Alternatively, a single adjustment assembly can be used to adjust the height of either the front or rear portion where the adjustment assembly includes a connecting linkage assembly to correspondingly adjust the height of the other portion of the seat bottom. The adjustment assembly utilizes a spring member to assist in lifting the seat from the lowered position to a raised position when the seat is occupied.

In a preferred embodiment of this invention, the manual adjustment assembly for adjusting the height of a vehicle seat includes first and second mounts for supporting a seat member movable between a lowered position and a raised position. A torque tube extends between the first and second mounts and defines a pivot axis. An actuator selectively supplies rotational input to the torque tube. The adjustment assembly also includes a resilient member supported by the torque tube that assists movement of the seat member from the lowered position to the raised position when actuated by the actuator.

The subject invention offers several advantages over prior art manual adjustment systems because it provides a simplified assembly for adjusting the vertical position of a seat within a vehicle that is durable, easy to assemble, and quiet in operation.

These and other features and advantages of the present invention will be best understood from the following specification and drawings, the following of which is a brief description.

DETAILED DESCRIPTION OF THE PREFERRED EMBODIMENT

Figure 1:
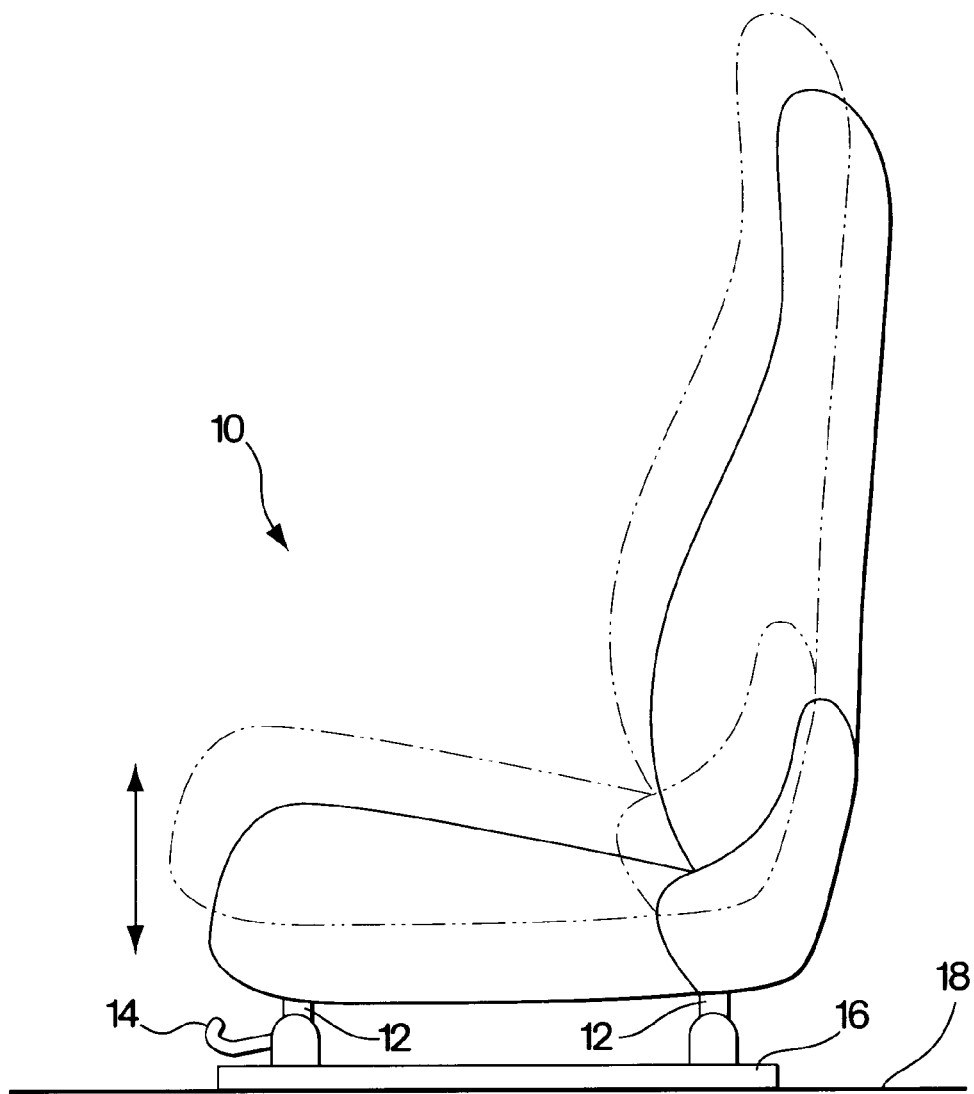
FIG. 1 is a side view of a seat with the subject adjustment assembly shown schematically.

FIG. 1 illustrates a vehicle seat assembly 10 that is vertically moveable between a lowered position and a raised position, indicated by the dashed lines, to accommodate drivers of varying heights. An adjustment assembly 12, shown schematically in FIG. 1, is used to move the seat assembly 10 between the lowered and raised positions. The adjustment assembly 12 is manually activated via a handle 14 preferably mounted to a side of the seat assembly 10. The handle is connected to a clutch actuator mechanism which actuates the adjustment assembly 12, as will be discussed in greater detail below.

The seat assembly 10 is preferably supported on a track assembly 16 that is mounted to a vehicle structure 18 such as a vehicle floor. The seat assembly 10 can be moved in fore and aft directions along the track assembly 16 to adjust the position of the seat assembly 10 with respect to vehicle control pedals (not shown).

Figures 2A, 2B:
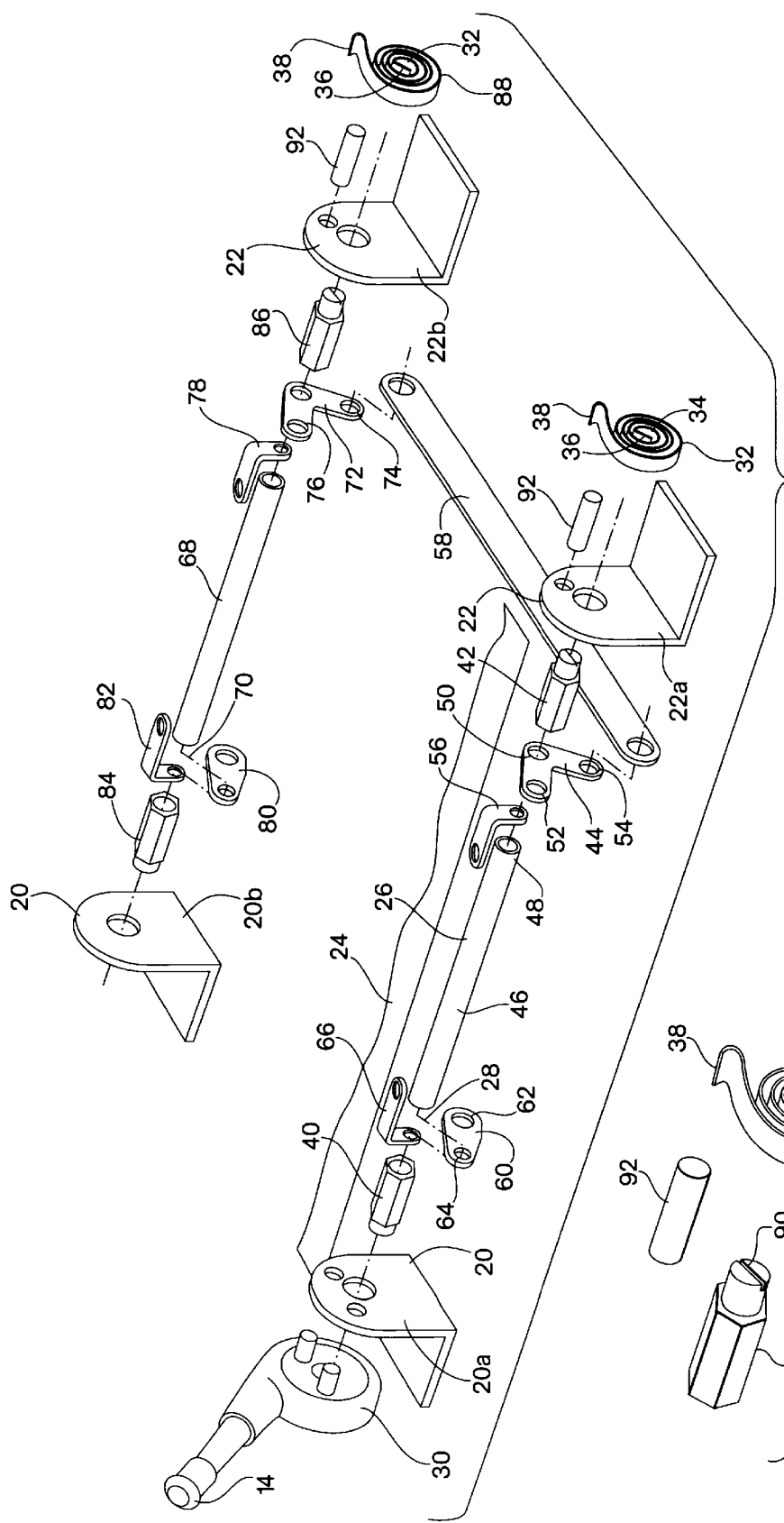
FIG. 2A is an exploded view of the subject adjustment assembly
FIG. 2B is an enlarged perspective view of the spring and pin shown in FIG. 2A.

An exploded view of the seat adjustment assembly 12 is shown in FIG. 2A. The adjustment assembly includes a first mount 20 and a second mount 22 which are mounted to the track assembly 16. The first mount 20 is connected to an outboard side of the track assembly while the second mount 22 is connected to an inboard side of the track assembly. The first 20 and second 22 mounts are brackets that are used to support the adjustment assembly 12. Although not shown, track assembly 16 consists of a lower track fixed to the vehicle and an upper track movable with the seat. It is this upper track 14 to which brackets 20 and 22 are fixed.

The first mount 20 is preferably comprised of a front bracket 20a for supporting the adjustment assembly 12 near a front portion of the seat assembly 10 and a rear bracket 20b for supporting the adjustment assembly 12 near a rear portion of the seat assembly 10. Similarly, the second mount 22 is preferably comprised of a front bracket 22a for supporting the adjustment assembly 12 near the front portion of the seat assembly 10 and a rear bracket 22b for supporting the adjustment assembly 12 near the rear portion of the seat assembly 10.

Additionally, the first 20 and second 22 mounts support a portion of the seat assembly 10 so that movement initiated by the adjustment assembly 12 can be transferred to a seat member 24 to move the seat assembly 10 between the raised and lowered positions. The seat member 24 is preferably any of various frame members for a seat bottom.

The adjustment assembly 12 includes a first torque tube 26 that extends between the front bracket 20*a* of the first mount 20 and the front bracket 22*a* of the second mount 22. The first torque tube 26 defines an axis of rotation 28 about which the first torque tube 26 twists as it receives input from an actuator 30. The actuator 30 is preferably a clutch mechanism that is selectively activated by the handle located adjacent to one side of the seat assembly 10. When an occupant is seated on the seat assembly 10, and the handle is moved, the clutch mechanism moves from a locked position to an unlocked position resulting in adjustment capability to move the seat 10 between the lowered and raised positions.

When the handle 14 is moved, the actuator 30 supplies rotational input to the first torque tube 26. A resilient member 32 is supported by the first torque tube 26 for assisting movement of the seat member 24 from the lowered position to the raised position when actuated by the actuator 30. The resilient member 32 is preferably a coiled spring that assists in raising the height of the seat 10 when it is occupied. The spring 32 helps the seat occupant lift their own weight and the weight of the seat when moving the seat from the lowered to the raised position.

The coiled spring 32 defines a center 34 that is concentric with the pivot axis 28. The spring 32 has a first spring end 36 that is fixed to the torque tube 26 and a second spring end 38 that is fixed to one of the mounts.

The torque tube 26 includes a first plug 40 that extends through the first mount 20 and into the actuator 30. The first plug 40 is preferably a swage plug that is inserted into an end 46 of the torque tube 26. The torque tube 26 includes a second plug 42 that extends through the second mount 22, and which attaches to the spring 32. The second plug 42 is also preferably a swage plug.

A front drive link 44 is rotatably supported on an end 48 of the torque tube 26 opposite from the end 46. The front drive link 44 includes an aperture 50 through which the torque tube 26 is inserted. The front drive link 44 rotates with the torque tube 26 when it receives input from the actuator 30. The front drive link 44 includes a first attachment portion 52 and a second attachment portion 54. The first attachment portion 52 connects to a first seat bracket 56 which is connected to the seat member 24. The second attachment portion is connected to a connector link 58 which extends to a rear adjustment assembly for adjusting the height of the rear portion of the seat 10.

A front slave link 60 is rotatably supported on end 46 of the torque tube 26. The front slave link 60 includes an aperture 62 through which the torque tube 26 is inserted and includes a single attachment portion 64 for connecting to a second seat bracket 66 which is connected to the seat member 24. When the front drive link 44 is rotated about the pivot axis 28 to raise the seat, the first attachment portion 52 moves upwardly causing the first seat bracket 56 to move upwardly, which causes the front of the seat member 24 to raise. As seat member 24 is rising the second seat bracket 66 also moves upwardly, which causes the slave link 60 to rotate about the torque tube 26.

The rear adjustment assembly for raising the rear portion of the seat connector includes a similar linkage assembly as found in the front however, the rear adjustment assembly does not include an actuator 30. The rear adjustment assembly receives its input from the connector link 58. The connector link 58 extends from the front bracket 22*a* of the second mount 22 to the rear bracket 22*b* of the second mount 22. A second torque tube 68 extends from the rear bracket 22*b* of the second mount 22 to the rear bracket 20*b* of the first mount. The second torque tube defines a second axis of rotation 70 that is generally parallel to the first axis of rotation 28. The second torque tube 68 twists about the second axis of rotation 70 when it receives rotational input from a rear drive link 72 via the connector link 58.

The rear drive link 72 is supported on the torque tube and includes a first attachment portion 74 for connection to the connector link 58 and a second attachment portion 76 for connection to a third seat bracket 78 which is connected a seat member 24. A rear slave link 80 is supported an end of the torque tube 68 opposite from the drive link 72 and is attached to a fourth seat bracket 82. A plug 84 is inserted into the end of the torque tube 68 and fixes the torque tube 68 to the rear bracket 20*b* of the first mount 20. A second plug 86 is inserted into the other end of the torque tube 68 and extends through the rear bracket 22*b* of the second mount 22 where it attaches to a second resilient member 88. The second resilient member 88 is preferably a coiled spring having a center concentric with the second axis of rotation 70 and works in conjunction with the first spring 32 to lift the seat from a lowered position to a raised position. While a pair of springs 32, 88 are shown, it should be understood that the adjustment assembly 12 could operate with only one spring or could have more than two springs.

When the front drive link 44 is rotated, the connector link 58 causes the second torque tube 68 to twist about the axis 70, This causes the rear drive link 72, with the assistance of the second spring 88, to rotate and lift the rear portion of the seat 10 causing the rear slave link 80 to also rotate about the torque tube 68. Thus, the operation of the adjustment assembly 12 starts with the activation of the handle 14, which releases the actuator 30 causing the first torque tube 26 to twist. This causes the front drive 44 and slave 60 links to rotate, which lifts the front portion of the seat. As the front drive link 44 is rotating, the connector link 58 is caused to move linearly causing rotational input to be given to the second torque tube 68 via the rear drive link 72. The rear drive 72 and slave 80 links rotate, which causes the rear portion of the seat to rise. The first 32 and second 88 springs assist in raising the seat 10 from the lowered position to the raised position.

As discussed above, each of the springs 32, 88 have a first spring end 36 that is fixed to its respective torque tube 26 or 68 and a second spring end 38 that is fixed to one of the mounts. As shown in greater detail in FIG. 2B, the plug 42 that extends from the torque tube 26 has a slot 90 for fixably receiving the first spring end 36. Plug 86 has identical structure. The second spring end 38 is attached to one of the mounts with a pin 92. Note that the springs 32, 88 are mounted on an opposite side of their respective torque tube 26, 68 from the actuator 30.

While the actuator 30 and spring 32 are mounted as shown on opposite ends of the torque tube 26 with the actuator mounted to the first mount 20 and the spring attached to the second mount, the reverse orientation could also be used. Thus, the actuator 30 could be mounted to the second mount 22 and the spring 32 could be mounted to the first mount.

The plugs 40, 42, 84, and 86 are shown as separate components that are installed within the respective torque tubes 26, 68. It should be understood that these plugs 40, 42, 84, 86 could be integrally formed as end portions on the torque tubes 26, 68 instead of being separate pieces.

Figure 3A:
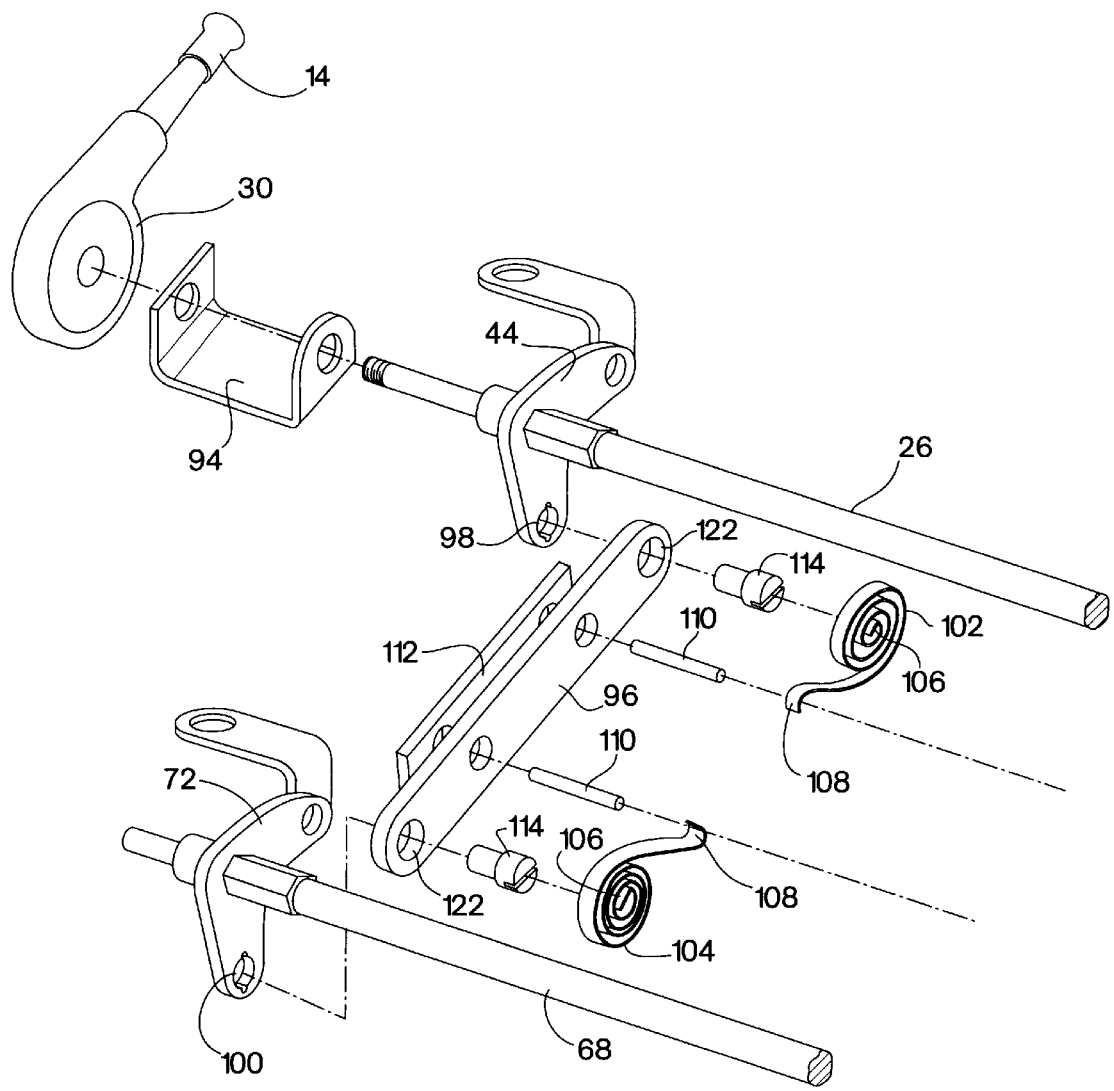
FIG. 3A is an exploded view of an alternate embodiment of the adjustment assembly.

An alternate embodiment of the adjustment assembly 12 for moving a vehicle seat 10 between raised and lowered positions is shown in FIG. 3A. Individual components that were used in the first embodiment shown in FIG. 2A and which are the same in the embodiment shown in FIG. 3A will have the same numerical identifications. The adjustment assembly includes first 26 and second 68 torque tubes with a single actuator 30 connected to the first torque tube 26. The second torque tube 68 is spaced rearwardly from and is generally parallel to the first torque tube 26. The actuator 30 is connected to the first torque tube 26 by a pivot bracket 94. A front drive link 44 is supported on the first torque tube 26 and a rear drive link 72 is supported on the second torque tube 68. The drive links 44, 72 are attached to seat brackets in a similar manner as discussed with regard to the first embodiment.

A connector link 96 is attached to a first attachment portion 98 on the front drive link 26 and to a second attachment portion 100 on the rear drive link 68. The connector link is comprised of a horizontal bar that is generally perpendicular to the first 26 and second 68 torque tubes. The connector link 96 remains horizontal throughout seat adjustment as the drive links 44, 72 rotate simultaneously about their respective torque tubes 26, 28.

A first resilient member 102 is connected to the front drive link 44 and a second resilient member 104 is connected to the rear drive link 72. The first and second resilient members 102, 104 are preferably coiled springs that assist in lifting the seat 10 from the lowered position to the raised position. The springs 102, 104 each have a first spring end 106 attached to their respective drive link 44, 72 and a second spring end 108 attached to the connector link 96. Thus, the springs 102, 104 are mounted differently in this embodiment than in the first embodiment where the springs 32, 88 had one end 36 mounted to their respective torque tube 26, 68 while the other end 38 was mounted to one of the mounts 20, 22. Note also that the springs 102, 104 are mounted on the same side of their respective torque tube 26, 68 as the actuator 30. This offers flexible packaging options for other seat adjustment components.

The second ends 108 of the springs 102, 104 are preferably attached to the connector link 96 with a pin 110. The pin 110 extends through the connector link 96 and through a support link 112 that is mounted along side the connector link 96. The first ends 106 of the springs 102, 104 are connected to their respective drive links 44, 72 with a pin 114. While pins 110 are shown for connecting the springs 102, 104 to the link 96, the pins 110 could be replaced by a tab formed on the link 96, or other fastening methods well known in the art could be used for attaching the springs 110 to the link 96.

Figure 3B:
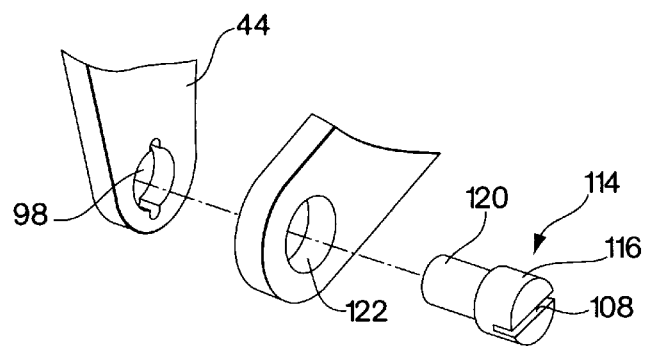
FIG. 3B is an enlarged perspective view of the spring attachment shown in FIG. 3A.

This connection is shown in more detail in FIG. 3B. The pin 114 includes has a head 116 with a slot 118 for receiving the first end of the spring 104. The pin 114 has a body member 120 of smaller diameter than the head 116 which extends through an aperture 122 in the connector link 96 and through attachment portion 98, 100 of the drive link 44, 72.

Figure 4:
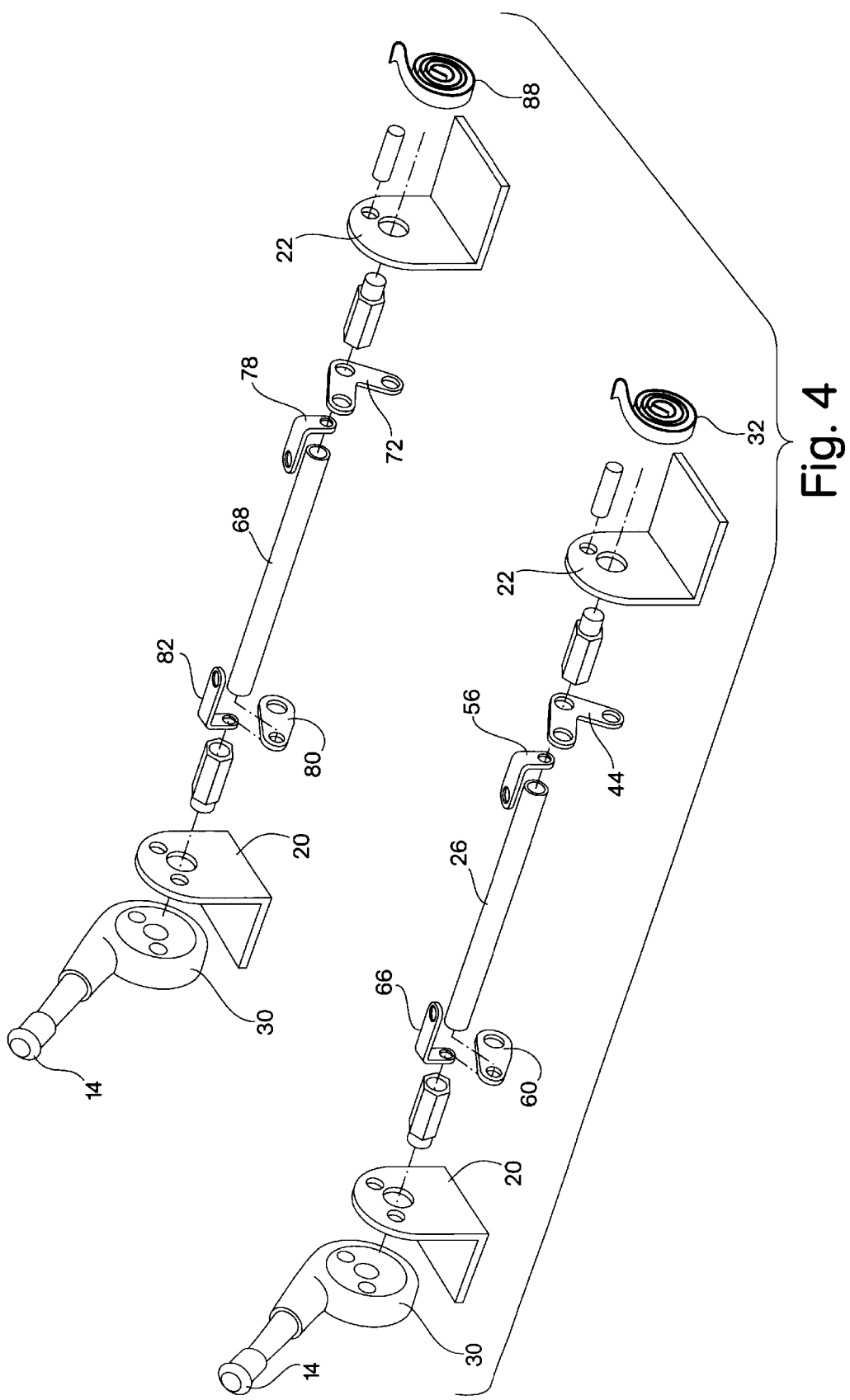
FIG. 4 is an exploded view of an alternate embodiment of the adjustment assembly.

Another embodiment of the seat adjustment assembly is shown in FIG. 4. This embodiment is similar to the embodiment shown in FIG. 2A, however, each torque tube 26, 68 is connected to an actuator 30 and the connector link 58 has been removed. This configuration allows a seat occupant to selectively adjust the height of the front portion of the seat independently from the rear portion of the seat and vice versa.

Figure 5:
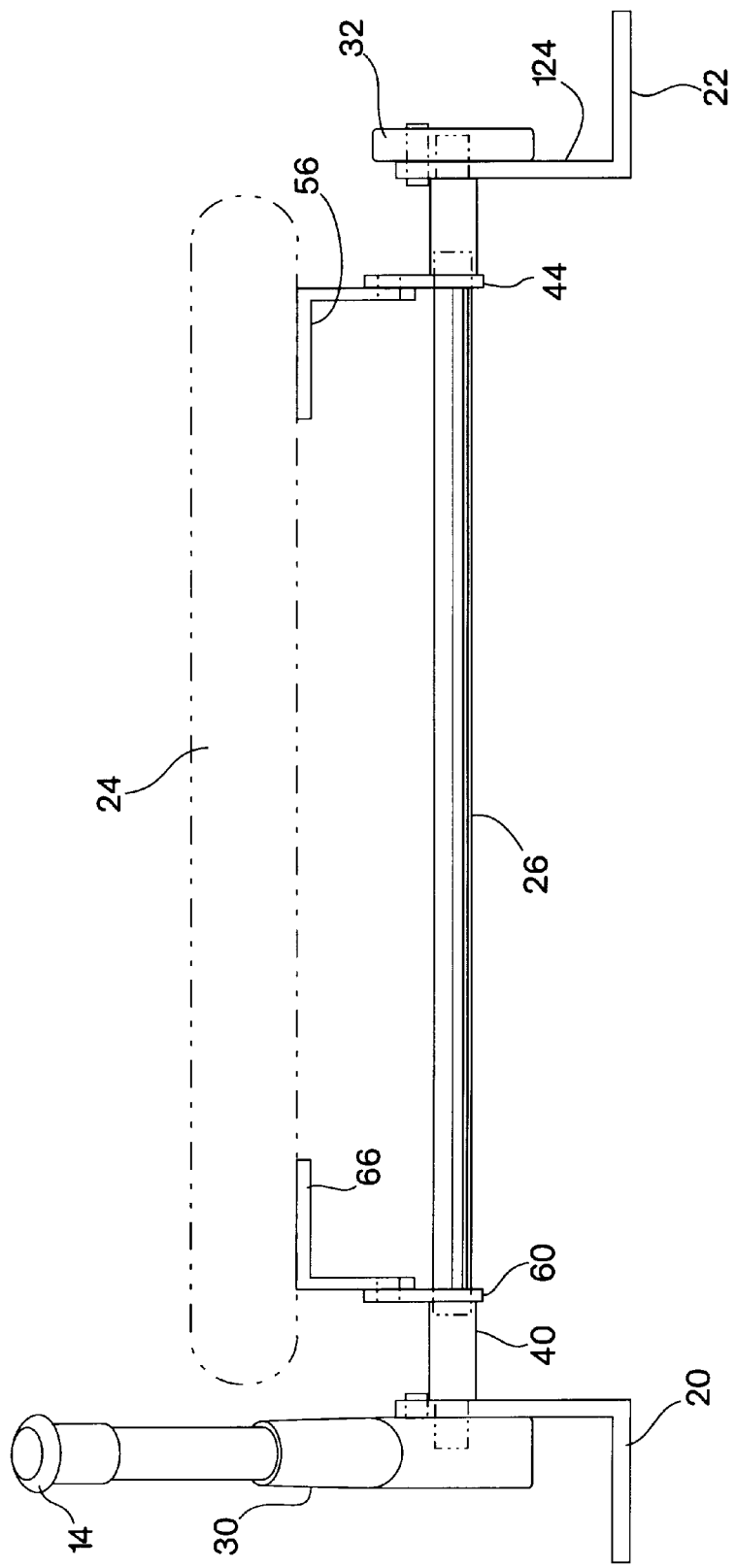
FIG. 5 is a front view of the adjustment assembly shown in FIG. 2A.

A front view of the torque tube 26 of the adjustment assembly 12 as described above with regard to FIGS. 2A and FIG. 4 is shown in FIG. 5. The spring 32 is mounted on an external face 124 of the second mount 22 opposite from the actuator 30.

The seat adjustment assembly shown in FIG. 4, would operate in a manner similar to that discussed above with regard to the embodiment shown in FIG. 2A. The front actuator would be operated by the occupant to supply rotational input to the first torque tube 26 which rotates the front drive link 44 with the assistance of the spring 32. The rear actuator would be independently operated to supply rotational input to the second torque tube 68 which rotates the rear drive link 72 with the assistance of the second spring 88.

The embodiments of the subject seat adjustment assembly 12 discussed above, greatly reduce the number of parts typically used in a manual height adjuster for a seat which significantly reduces assembly time and overall material cost. Additionally, mounting the assist springs at one end of the torque tube, either on an opposite side from the actuator or on the same side as the actuator, offers great flexibility in packaging that is available for other components.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A manual adjustment assembly for adjusting the height of a vehicle seat comprising, in combination:

a first mount;

a second mount spaced apart from said first mount, said first and second mounts for supporting a seat member that is movable between a lowered position and a raised position;

a torque tube extending between said first and second mounts and defining a pivot axis, the torque tube having a first end fixed to said first mount and a second end rotatable about said pivot axis, and an end portion comprising a swage plug installed on one end of said torque tube;

an actuator for selectively supplying rotational input to said torque tube; and a resilient member supported by said torque tube for assisting movement of said seat member from said lowered position to said raised position when actuated by said actuator, wherein said resilient member is a spring having a first spring end attached to said end portion and a second spring end attached to one of said mounts, said plug having a slotted end for receiving said first spring end.

2. An assembly as recited in claim 1 wherein said resilient member is a coiled spring defining a center that is concentric with said pivot axis.

3. An assembly as recited in claim 1 wherein said resilient member is a spring having a first end fixed to said torque tube and a second end fixed to one of said mounts.

4. An assembly as recited in claim 1 including a drive link rotatably supported on said torque tube and connected to the seat member for moving the seat member between said lowered and raised positions when said torque tube rotates said drive link.

5. An assembly as recited in claim 4 wherein said drive link includes a first connection portion for attachment to the seat member and a second connection portion for attachment to a connector link.

6. An assembly as recited in claim 5 including a support rod and linkage assembly connected to said support link, said support rod being spaced rearwardly from said torque tube, wherein said connector link extends from said torque tube to said linkage assembly such that when said torque tube rotates, said drive link moves a forward portion of the seat member in a vertical direction while simultaneously moving said connector link, causing said linkage assembly to move a rearward portion of the seat member in a vertical direction.

7. A manual adjustment assembly for adjusting the height of a vehicle seat comprising, in combination:
   a first mount;
   a second mount spaced apart from said first mount, said first and second mounts for supporting a seat member that is movable between a lowered position and a raised position;
   a first torque tube extending between said first and second mounts;
   an actuator for selectively supplying rotational input to said first torque tube;
   a first drive link supported on one end of said first torque tube for rotation therewith;
   a first resilient member connected to said first drive link for assisting movement of said seat member from said lowered position to said raised position when actuated by said actuator;
   a second torque tube spaced rearwardly from and generally parallel with said first torque tube and a second drive link supported on one end of said second torque tube for rotation therewith, said first and second drive links being interconnected by a connector link; and
   a second resilient member connected to said second drive link for assisting movement of said seat member from said lowered position to said raised position when actuated by said connector link.

8. An assembly as recited in claim 7 wherein said first drive link has a first connection portion for attachment to a front part of said seat member and said second drive link has a second connection portion for attachment to a rear part of said seat member, said first drive link for moving said front part of said seat member between said lowered and raised positions and said second drive link for moving said rear part of said seat member between said lowered and raised positions.

9. An assembly as recited in claim 8 wherein said connector link remains generally horizontal as front and rear parts of said seat member are moved between said raised and lowered positions.

10. An assembly as recited in claim 7 wherein each of said first and second resilient members includes a first end received in a first fastener and a second end attached to a stop located on said connector link, said first fasteners for connecting said resilient members to said drive links and said connector link.

11. A manual adjustment assembly for adjusting the height of a vehicle seat comprising, in combination:
   a first mount;
   a second mount spaced apart from said first mount, said first and second mounts for supporting a seat member that is movable between a lowered position and a raised position;
   a first torque tube extending between said first and second mounts and defining a first pivot axis;
   a first actuator for selectively supplying rotational input to said first torque tube;
   a first drive link supported on one end of said first torque tube for rotation therewith;
   a first resilient member supported by said first torque tube for assisting movement of said seat member from said lowered position to said raised position when actuated by said actuator;
   a second torque tube spaced rearwardly from and generally parallel to said first torque tube and defining a second pivot axis;
   a second actuator for selectively supplying rotational input to said second torque tube;
   a second drive link supported on one end of said second torque tube for rotation therewith;
   a second resilient member supported by said second torque tube wherein said first resilient member assists in moving a front part of said seat member between said lowered and raised positions when actuated by said first actuator and said second resilient member assists in moving a rear part of said seat member between said lowered and raised positions when actuated by said second actuator and;
   a first plug installed in one end of said first torque tube for receiving said first resilient member and a second plug installed in one end of said second torque tube for receiving said second resilient member;
   wherein said first drive link is supported on said first torque tube for rotation therewith and said second drive link is supported on said second torque tube for rotation therewith, said first drive link being attached to said front part of said seat member and said second drive link being attached to said rear part of said seat member such that said front part of said seat member is moved between said lowered and raised positions when said first torque tube rotates said first drive link about said first pivot axis and said rear part of said seat member is moved between said lowered and raised positions when said second torque tube rotates said second drive link about said second pivot axis.

12. An assembly as recited in claim 11 wherein said first resilient member is a coiled spring defining a center that is concentric with said first pivot axis and wherein said actuator is located at one end of said first torque tube and said coiled spring is located at an opposite end of said first torque tube.

13. A seat assembly as recited in claim 11 wherein said first resilient member is a first coiled spring defining a first center that is concentric with said first pivot axis and said second resilient member is a second coiled spring defining a second center that is concentric with said second pivot axis, said first and second coiled springs each having a first end attached to said respective torque tube and a second end attached to one of said mounts.

* * * * *